Feb. 18, 1969     R. W. TAYLOR-MYERS     3,427,933
ROAD SURFACE MARKER AND INSTALLATION APPARATUS THEREFOR
Filed Dec. 29, 1967
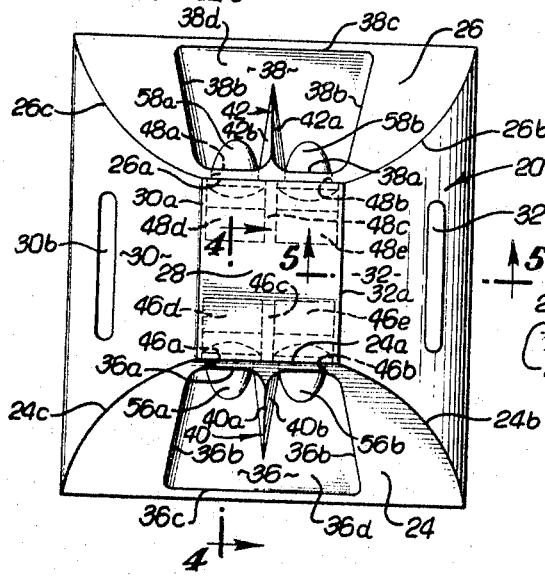
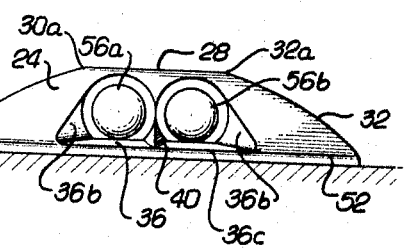
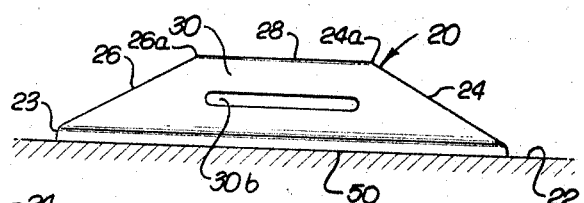
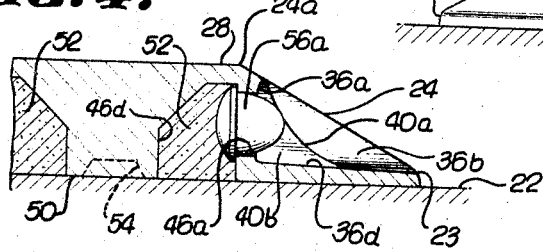
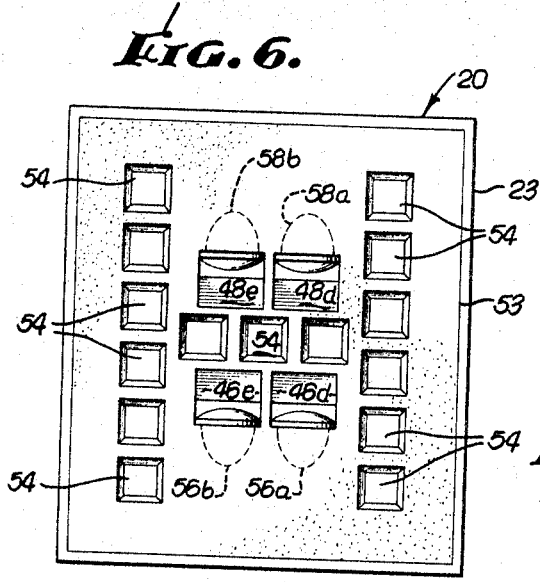
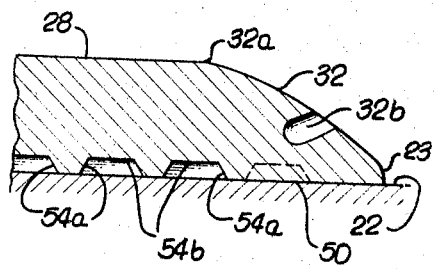
INVENTOR.
ROBERT W. TAYLOR-MYERS
By Huebner & Worrel
ATTORNEYS.

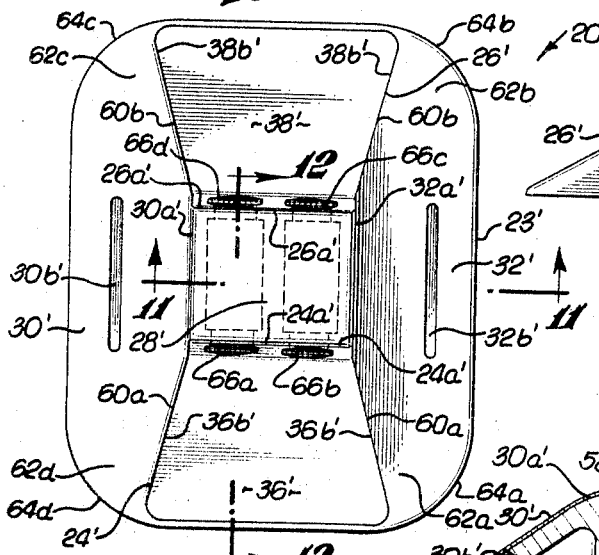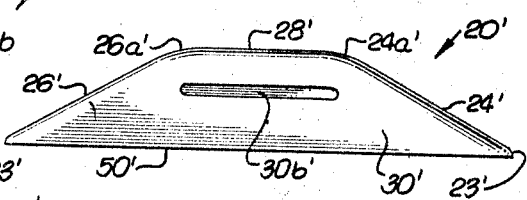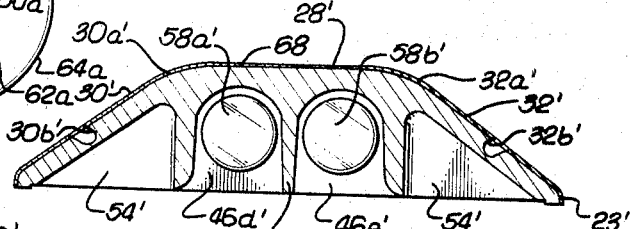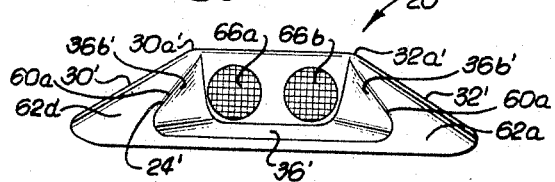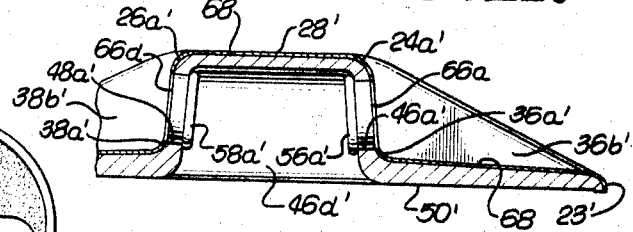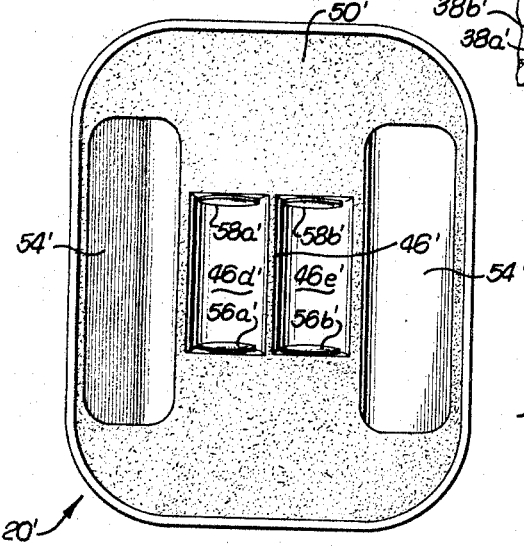

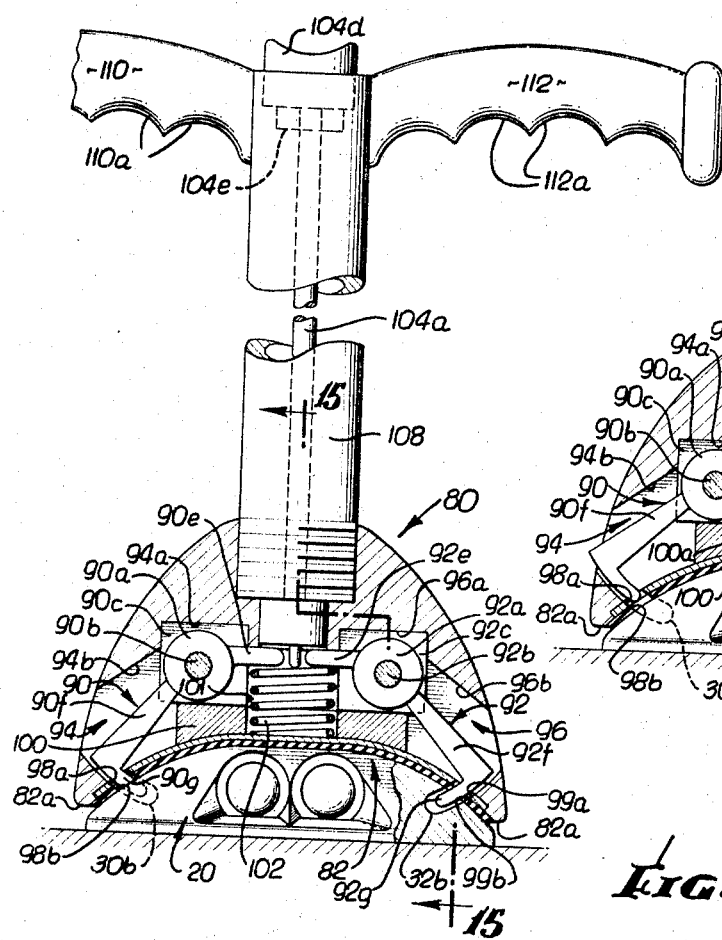
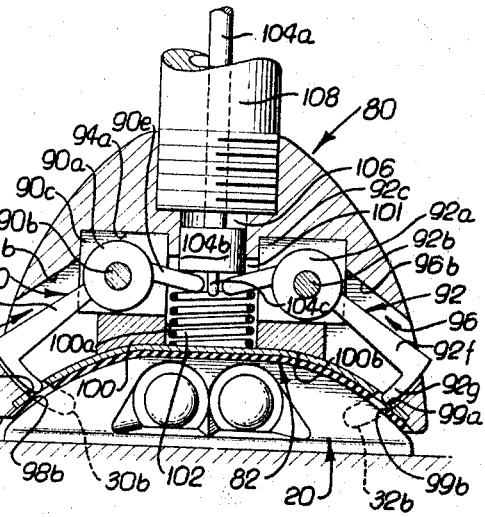
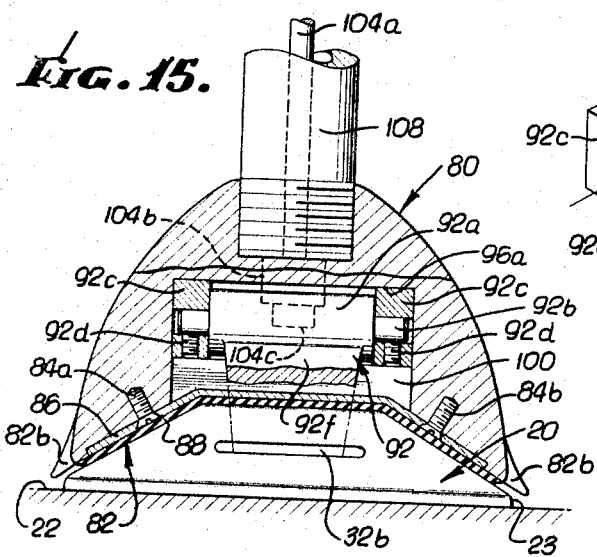
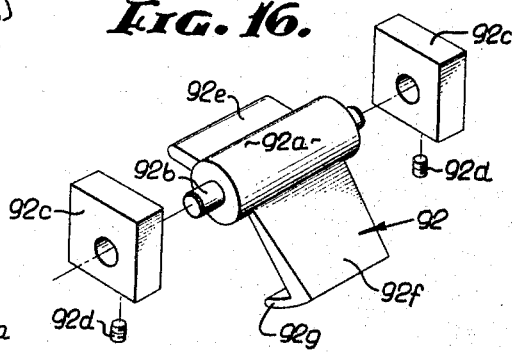
INVENTOR.
ROBERT W. TAYLOR-MYERS
By Huebner & Worrel
ATTORNEYS.

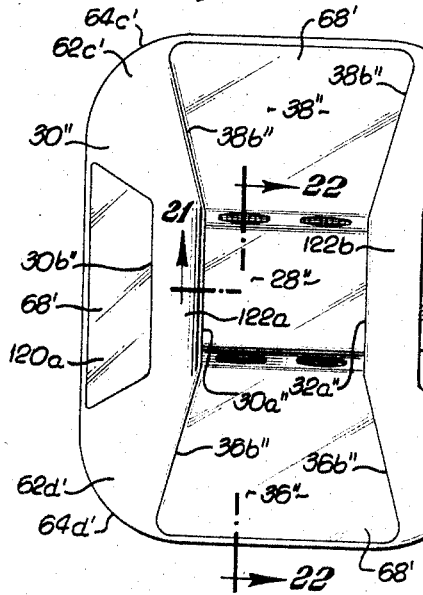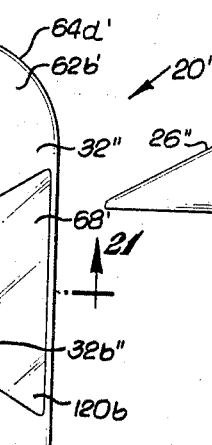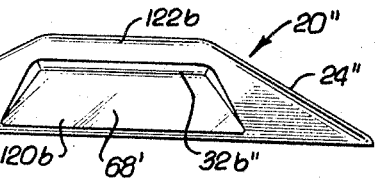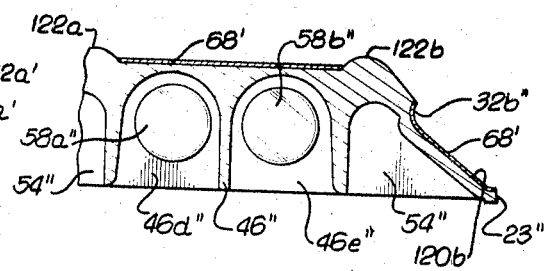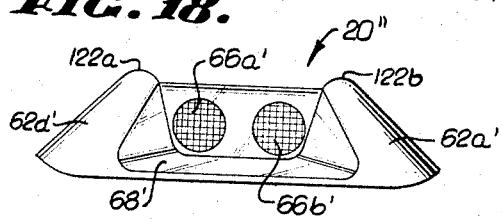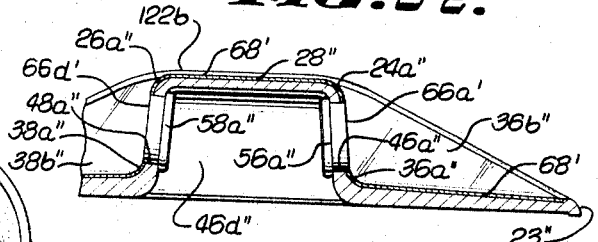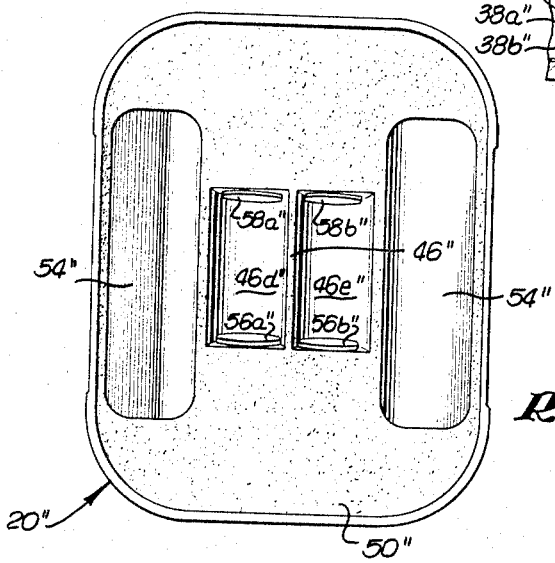

United States Patent Office 3,427,933
Patented Feb. 18, 1969

3,427,933
ROAD SURFACE MARKER AND INSTALLATION APPARATUS THEREFOR
Robert W. Taylor-Myers, 2580½ N. Beachwood Drive, Hollywood, Calif. 90028
Continuation-in-part of application Ser. No. 602,985, Dec. 19, 1966. This application Dec. 29, 1967, Ser. No. 701,805
U.S. Cl. 94—1.5
Int. Cl. E01f 9/00; E01c 23/16, 19/00
20 Claims

ABSTRACT OF THE DISCLOSURE

A marker device comprised of a small flat structure having sloping forward and rear ramp-like faces and sloping side shoulders. Recessed below the outer surfaces of the structure are vertical faced reflectors positioned to reflect light in alignment with the longitudinal axis of the device. To quickly install marker devices an apparatus is provided which has a recessed bottom opening shaped to conform to the upper periphery of a marker device. A retractable caliper-type grip can be moved into the recessed opening to grasp and hold a marker device or triggered to release a marker device held therein.

---

This application is a continuation-in-part of my copending application Ser. No. 602,985, filed Dec. 19, 1966 and now abandoned.

The continually increasing vehicular traffic on the nation's highways makes it imperative that traffic safety be given the highest priority in government programs. One of the major traffic hazards is caused by improper lane changing. Often this is due to deterioration of the visibility of lane markers. This problem becomes particularly acute in inclement weather when the conventional lines painted on highways tend to become obscured from view. Moreover, such painted lines readily become worn and lose their original visibility. On the other hand, physical reflector type lane markers prior to this invention have not combined the desired features of maximum visibility, ruggedness, simplicity and economy of installation sufficiently enough to be highly recommended.

Therefore, it is a primary object of this invention to provide rugged road surface marker structures having reflectors aligned along highway lanes which can be secured in place with a minimum of expense and maximum of efficiency.

A further object of this invention is to provide a road surface marker which is highly resistant to wear and at the same time does not damage nor materially accelerate the wear of vehicle tires passing thereover.

Still a further object of the invention is to provide a road surface marker over which a snowplow blade or the like may pass without damaging the marker.

Another object of this invention is to provide an installation apparatus for quickly emplacing road surface markers in alignment along a traffic lane divider line.

Other objects and advantages of this invention will become apparent from the following description and drawings wherein:

FIGURE 1 is a top plan view of a road surface marker in accordance with this invention;

FIGURE 2 is an end elevational view of the road surface marker as shown in FIGURE 1;

FIGURE 3 is a side elevational view of the road surface marker as shown in FIGURE 1;

FIGURE 4 is a fragmented cross-sectional view taken along lines 4—4 in FIGURE 1;

FIGURE 5 is a fragmented cross-sectional view taken along lines 5—5 in FIGURE 1;

FIGURE 6 is a bottom plan view of the road surface marker as shown in FIGURE 1;

FIGURE 7 is a top plan view of a second embodiment of the road surface marker in accordance with this invention;

FIGURE 8 is an end elevational view of the road surface marker in FIGURE 7;

FIGURE 9 is a side elevational view of the road surface marker in FIGURE 7;

FIGURE 10 is a bottom plan view of the modified road surface marker in FIGURE 7;

FIGURE 11 is a cross-sectional view taken on lines 11—11 in FIGURE 7.

FIGURE 12 is a fragmented, cross-sectional view taken on lines 12—12 in FIGURE 7;

FIGURE 13 is a partly elevational, partly sectioned and fragmented view of an apparatus suitable for installing road surface markers in accordance with this invention shown holding a road surface marker;

FIGURE 14 is a sectioned view of the lower portion of the apparatus in FIGURE 13 shown releasing a road surface marker;

FIGURE 15 is a sectional view of the apparatus in FIGURE 13 turned 90° taken through 15—15 therein; and FIGURE 16 is a view of a caliper grip contained within the installing apparatus of FIGURES 13, 14 and 15;

FIGURE 17 is a top plan view of a third embodiment of the road surface marker in accordance with the present invention;

FIGURE 18 is an end elevational view of the road surface marker in FIGURE 17;

FIGURE 19 is a side elevational view of the road surface marker in FIGURE 17;

FIGURE 20 is a bottom plan view of the road surface marker in FIGURE 17;

FIGURE 21 is a fragmented cross-sectional view taken on lines 21—21 in FIGURE 17; and FIGURE 22 is a fragmented cross-sectional view taken on lines 22—22 in FIGURE 17.

The basic embodiment of the road surface marker in accordance with this invention is shown in FIGURES 1 through 6 in the drawings. Here, the body of the marker 20 is a shallow, partly dome-shaped, flat-bottomed rectangular structure which, when placed in spaced alignment with other such markers 20, is intended to be secured on a road surface 22 to provide a physical, highly visible lane-marking line. Though designated for illustrative purposes only, the relative dimensions of a suitable marker 20 are about 5 inches long, 4 inches wide and ⅞ deep. The lower outer rectangular periphery is defined by a slightly rounded outer marginal edge 23 which extends entirely around the marker.

The marker 20 is formed with identical inwardly and upwardly gradually sloping forward face 24 and rear face 26 or ramps which slant up from opposite end portions of marginal edge 23 and terminate at opposite end edges 24a and 26a of a flat central top surface 28. Identical vertically rounded side shoulders 30 and 32 slope downwardly and outwardly away from each side edge 30a and 32a, respectively, of center top surface 28 to opposite side portions of marginal edge 23. The ends of shoulders 30 and 32 terminate at the vertically curved forward edges 24b and 24c and vertically curved rear edges 26b and 26c, respectively, of faces 24 and 26. To facilitate lifting the markers 20 shallow upwardly curved horizontal slots 30b and 32b are cut at a downward inclination into the lower center portion of shoulders 30 and 32, respectively.

The slope of face 24 and 26 is gradual enough to prevent severe jolting or damage to vehicular tires passing thereover, but sufficient to provide a discernible bump which will alert inattentive drivers to the presence of the lane divider line. Moreover, the angle of slope is consistent with the requisite structural strength needed for the particular material used so as to maximize the fracture and wear resistance of the marker.

Centrally recessed and extending inwardly from opposite end portions of marginal edge 23 to near the end edges 24a and 26a are large open spaces or lobbies 36 and 38 which are formed in faces 24 and 26, respectively. These lobbies 36 and 38, respectively, are approximately the width of and laterally in alignment with top surface 28 at the upper edges of their generally vertical back walls 36a and 38a but flare out slightly along their opposing side walls 36b and 38b from their back walls 36a and 38a toward their bottom edges 36c and 38c.

Longitudinally aligned with the center of the marker 20 and extending centrally into each of the lobbies 36 and 38 from the upper edges of back walls 36a and 38a, respectively, are narrow vertical divider buttresses 40 and 42 which are formed with concavely curved forward edges 40a and 42a. These buttresses extend down to intermediate horizontal portions of the floors 36d and 38d of lobbies 36 and 38 which extend inwardly from bottom edges 36c and 38c to the bottom of back walls 36a and 38a. The generally vertical side walls 40b and 42b of each of the buttresses 40 and 42, respectively, diverge outwardly from forward edges 40a and 42a along floors 36d and 38d toward the back walls 36a and 38a. The forward edges 40a and 42a of buttresses 40 and 42 are disposed inwardly from the ramps or sloping faces 24 and 26 so that they are not ordinarily subjected to road wear but provide solid central support for the central portion of the structure adjacent to lobbies 36 and 38.

A pair of circular sockets 46a and 46b opening through the back wall 36a and sockets 48a and 48b opening through the back wall 38a extend inwardly toward each other through the center portion of the marker 20 from lobbies 36 and 38 on each side of buttresses 40 and 42, respectively. The sockets 46a, 46b, 48a and 48b are axially aligned with the longitudinal axis of the marker 20 and are in common horizontal plane therein. Sockets 46a and 46b are spaced from each other by a divider wall 46c extending in longitudinal alignment directly inwardly from buttress 40. In a like manner sockets 48a and 48b are divided within the central portion of marker 20 by a divider wall 48c which extends longitudinally inward directly in alignment with buttress 42. The sockets 46a, 46b, 48a and 48b open into and terminate in reflector housing cavities 46d, 46e, 48d and 48e, respectively, which, in turn each extend down through the marker 20 and open into the flat bottom surface 50 thereof upon which a liquid adhesive 52 is to be applied.

In order to provide a better footing for the adhesive 52 substantially the entire bottom surface 50 of a marker 20 is roughened by sand blasting it out to a continuous inner marginal line 53 spaced slightly inwardly from the outer marginal edge 23. Moreover, to further provide the maximum possible amount of adhesive contact between the marker 20 and a road surface 22 to which it is to be attached a number of shallow pockets 54 are formed in the bottom surface 50. These pockets 54 are generally square in shape and formed with slightly upwardly converging inner walls 54a and a flat horizontal ceiling 54b. They are preferably positioned in the bottom surface 50 of a marker 20 and spaced from each other in a pair of longitudinally aligned parallel rows centrally joined by a perpendicular middle row of spaced pockets 54 so as to form an H as shown in FIGURE 6. This arrangement of the pockets 54 is to position them in the thickest portions of the marker 20 so as to avoid weakening the structure. Thus, they longitudinally extend beneath the thick upper portions of shoulders 32 and 34 and under the center top surface 28 between cavities 46d, 46e, 48d and 48e. When liquid adhesive 52 is applied to the bottom of the marker 20 it will thus stick to the roughened bottom surface 50 in a thin layer and flow into and fill the pockets 54 and cavities 46d, 46e, 48d and 48e in thick masses which, when dry, will provide solid fingers of adhesive to grip the road surface 22 upon which the marker 20 is to be secured. Preferably, the marker 20 is made of acrylic plastic or a material of similar characteristics and the adhesive used to secure it in place is epoxy cement. To aid visibility during daylight the plastic is white, yellow or other selected color which eliminates the necessity for periodic painting.

Pitted within the sockets 46a, 46b, 48a and 48b are, respectively, complementary cylindrical paired reflectors 56a, 56b, 58a and 58b axially aligned therewith. The outer, bulging, convexly curved, acorn-shaped faces of these reflectors are generally vertical relative to their longitudinal axes and visible through lobbies 36 and 38 but do not project beyond the outer periphery of ramps 24 and 26. They are formed of glass or plastic with red, white or yellow lens structures designed to intensely reflect light substantially directly in alignment with their longitudinal axes. Thus, at night the paired reflectors, as best shown in FIGURE 2, look like a pair of cat's eyes and, when a number of these are in alignment a stream of light is reflected as a composite to indicate a lane divider line on a road surface. The rear of the cylindrical reflectors 56a, 56b, 58a and 58b extend into the cavities 46a, 46b, 48a and 48b, respectively, which are then filled with adhesive 52 such as epoxy cement that sets to securely hold the reflectors in position. Preferably the cavities are first partially filled with adhesive to secure the reflectors and then completely filled when secured to a road surface.

Another embodiment of the road surface marker shown in FIGURES 7 to 12 is preferably formed of a metal such as aluminum alloy, which is stronger than acrylic plastic. Therefore, such embodiment is more rugged and has a longer life than the plastic marker illustrated in FIGURES 1 to 6. In this embodiment, the basic structure is as previously described, and like numbers primed are used to indicate like or corresponding parts.

As best seen in FIGURES 7 and 8, the forward ramp 24' of the marker 20' is defined almost entirely by the upper edges 60a of the walls 36b' of the lobby 36', while the rear ramp 26' is defined almost entirely by the upper edges 60b of the walls 38b' of the lobby 38'.

The shoulders 30' and 32' are generally flat, as compared to the curved shoulders 30 and 32 in the embodiment illustrated in FIGURES 1 to 6, and slope downwardly and outwardly from each side edges 30a' and 32a', respectively, of the top surface 28' to opposite side portions of the marginal edge 23'. The shoulders 30' and 32' join the ramps 24' and 26' at horizontally, outwardly, curved or rounded edges 62a, 62b, 62c and 62d which extend downwardly from the corners of the generally rectangular top surface 28' to curved corners 64a, 64b, 64c, 64d, respectively, at the marginal edge 23'. The edges 24a', 26a', 30a' and 32a' of the top surface 28' are also rounded. As a consequence, the upper surfaces of the marker 20' which are subject to being contacted by vehicular tires passing thereover, are all rounded, thus lessening the jolting or damage to the tires. In addition, because of the rounded upper surfaces of the marker 20', the marker itself is less subject to damage if hard objects pass over the marker than would be with a marker having relatively sharp edges, such as the edges 24b, 24c, 26b and 26c of the marker 20.

Due to the weight and cost of aluminum, it is desirable to minimize the amount of aluminum employed in the marker 20'. Hence, relatively large pockets 54' are formed in the bottom surface 50' of the marker and two relatively large reflector housing cavities 46d' and 46e', separated by a longitudinally extending vertical dividing wall 46', open into the flat bottom surface 50'. In this embodiment the reflectors 56a', 56b', 58a' and 58b' have generally flat vertical faces 66a, 66b, 66c and 66d respectively, which are flush or co-planar with the outer surfaces of the back walls 36a' and 38a'. As a consequence, the divider buttresses 40 and 42 employed in the marker 20 are not required in the marker 20', the vertical faces of the reflectors 56a', 56b', 58a and 58b, being sufficiently withdrawn behind the ramps 24' and 26' so as to avoid being contacted by vehicular tires passing over the marker.

As best seen in FIGURE 11, the elongated slots 30b' and 32b' extent only partially into the shoulders 30' and 32', respectively, and hence do not extend fully into the pockets 54'. If the latter were the case, water could enter the pockets 54'. If the temperature were sufficiently low, water in pockets 54' would freeze, expand and lift the marker off the roadway.

The entire upper surface of the marker 20', except the reflectors, is provided with a bright coating, such as yellow or white poreclain enamel 68. Poreclain enamel is extremely rugged and subject to very little deterioration due to vehicular tires passing over a marker coated with the same. Thus, the marker 20' provided with the bright enamel coating 68 and the reflectors 56a', 56b', 58a' and 58b' serves both as a line marker in the daytime and as a reflector at night.

Prior to placing the road surface marker 20' on a highway, it is preferred to fill the cavities 46d' and 46e' and the pockets 54' opening in the lower surface 50' of the marker with a suitable filling material, such as epoxy resin compound, which is light and inexpensive. The epoxy cement utilized to secure the marker in place on a highway need only be applied to the lower metallic surface 50' of the marker, but could extend over the filled cavities if desired.

In order to rapidly and easily place road surface markers as previously described in position on a highway an installation device such as shown in FIGURES 13 through 15 is preferably used. Such an installation device generally includes a bell-shaped base housing 80 formed with a concave recessed cradle 82 opening from its bottom surface which is shaped to partly conform to the upper peripheral surfaces of a portion of a road surface marker 20 or 20'.

The bottom peripheral edge 82a of housing 80 which surrounds cradle 82 terminates slightly short of the marginal edge 23 of a marker 20 carried therein so as to aid a workman in seeing the marker when placing it in position. Also, vertical front and rear guide tabs 82b may be added to extend down from the front and rear portions of edge 82a. They are positioned in alignment with the longitudinal center axis of a marker carried in cradle 82. Thus, accurate axial alignment of the reflectors of a marker 20 along a lane divider line on a road surface 22 is greatly expedited and facilitated with these guidance structures.

Secured by screws 84a and 84b passing therethrough into complementarily threaded holes in the cradle 82 of housing 80 is a metal cover plate 86 which conforms substantially to the shape of the upper peripheral surfaces of marker 20 and also the shape of the portion of cradle 82 against which it abuts. To provide a resilient bearing surface against a marker 20 carried in the cradle 82 a layer of rubber sheet 88 is secured by adhesive or other suitable means flush against the cover plate 86 so as to substantially cover it entirely. It also conforms to the upper peripheral surfaces of a marker 20.

Pivotally mounted within hollowed portions of housing 80 are a pair of caliper grips 90 and 92. Each of these caliper grips 90 and 92, respectively, are comprised of central hollow cylindrical bodies 90a and 92a within which are axially carried spindles 90b and 92b which project from both ends of cylindrical bodies 90a and 92a. The caliper grips 90 and 92 are rotatably mounted on each of the projecting ends of spindles 90b and 92b in complementary sockets of end closure block-shaped sleeves 90c and 92c which are, in turn, adjustably secured in place by grub screws 90d and 92d, respectively, projecting therethrough.

Radiating from one side of each of the cylindrical bodies 90a and 92a are short catch plates 90e and 92e respectively, which are adapted to be actuated to rotate the caliper grips 90 and 92. And radiating, respectively, from the opposite side of the cylindrical bodies 90a and 92a at an angle of approximately 135° relative to catch plates 90e and 92e are relatively long grip arms 90f and 92f which terminate in inwardly curved gripping fingers 90g and 92g adapted to fit loosely in the complementarily shaped slots 30b and 32b of a marker 20.

The caliper grips 90 and 92 are mounted within the bell-shaped housing 80 in such a manner that they can be actuated simultaneously to cooperatively hold or release a marker 20 disposed within cradle 82. Thus, a pair of caliper cavities 94 and 96 are formed in housing 80 to carry caliper grips 90 and 92, respectively. These cavities 94 and 96 are formed with pivot chambers 94a and 96a which extend horizontally and longitudinally parallel along each side of the vertical center axis of housing 80. Each of these pivot chambers 94a and 96a are formed with an enlarged center portion about the length of cylindrical bodies 90a and 92a which terminate in block-shaped openings on each end slightly larger in size and longer than sleeves 90c and 92c. The respective portions of the caliper grips 90 and 92 are mounted therein.

Communicating with pivot chambers 94a and 96a and flaring down laterally and outwardly toward and through the adjacent sides of housing 80 are arm openings 94b and 96b which are slightly wider and longer than arms 90f and 92f. The depth of these arm openings 94b and 96b is sufficient to allow pivotal movement of the arms 90f and 92f in accordance with the purposes hereinafter described.

Cut through the cover plate 86 and rubber sheet 88 in each side of cradle 82 to complement the slots 30b and 32b of a marker 20 carried in cradle 82 are mating slot holes 98a, 98b and 99a and 99b, respectively. The fingers 90g and 92g of the respective caliper grips 90 and 92 are disposed within housing 80 so that when they are pivoted about spindles 90b and 92b the fingers 90g and 92g will rotate toward each other into gripping position through slot holes 98a, 98b, 99a and 99b and into the slots 30b and 32b of a marker 20 as in FIGURE 13. Conversely, they are positioned to release the marker 20 by rotating the fingers 90g and 90f away from each other and out of engagement with the slots 30b and 32b of a marker as in FIGURE 14. That is, the cylindrical bodies 90a and 92b of the caliper grips 90 and 92 are mounted to rotate within chambers 94a and 96a so that their respective arms 90f and 92f will pivot within openings 94b and 96b and allow their gripping fingers 90g and 92g to reach just far enough to pass through slot holes 98a, 98b, 99a and 99b into slots 30b and 32b to grip a marker 20 in cradle 82 when the caliper grips 90 and 92 are closed toward each other.

In order to support the block-shaped sleeves 90c and 92c on each end of the caliper grip bodies 90a and 92a within pivot chambers 94a and 96a a spacer block 100 is mounted within housing 80 below the pivot chambers 94a and 96b. The spacer block 100 is formed with a central vertical hole 100a surrounded by a continuous bottom surface 100b which conforms to the shape of that portion of the adjacent inner surface of cover plate 86 against which it abuts when secured in place. Spacer block 100 is constructed so that it is deep enough, when mounted within housing 80, to provide a bottom support for the block-shaped sleeves 90c and 92c which is sufficient to hold them in position. However, enough space is left for small vertical adjustments of protruding grub screws 92d. These grub screws will bear against the top surface 100c of spacer block 100 and when vertically adjusted, will move caliper grips 90 and 92 within cavities 94 and 96, respectively.

Centrally disposed within housing 80 between caliper cavities 94 and 96 and in communication with each of the pivot chambers 94a and 96a thereof is a vertical spring chamber 101 formed to receive a cylindrical coiled spring 102 axially vertically positioned therein. Spring chamber 101 is wide enough to permit entry of catch plates 90e and 92e therein so that they can approach toward each other and bear downwardly against opposite portions of the top surface of spring 102.

Spring chamber 101 also is sufficiently deep that catch plates 90e and 92e can pivot therein sufficiently to cause the respectively associated gripping fingers 90g and 92g to pivot toward each other and through slot holes 98a, 98b, 99a and 99b in gripping position as in FIGURE 12 and retract therefrom as in FIGURE 13. The length of spring 102 is such that when vertically placed in spring chamber 101 its bottom end will pass through complementary hole 100a in spacer block 100 and bear against the inner surface of cover plate 86 and its top end will bear against the bottom surfaces of latch plates 90e and 92e within spring chamber 101 to resiliently normally hold the caliper grips 90 and 92 in closed marker gripping position as in FIGURE 13. By pressing down on the top of latch plates 90e and 92e against the resilient pressure of spring 102 the gripping fingers 90g and 92g are, accordingly, pivoted to the retracted marker releasing position shown in FIGURE 14.

In order to remotely actuate the retraction of gripping fingers 90g and 92g a plunger type trigger is disposed in operative position relative to the caliper grips 90 and 92. Thus, as shown, this trigger is comprised of a central elongated plunger connecting rod 104a, a lower cylindrical plunger base sleeve 104b connected to the bottom end thereof, a plunger base divider plate 104c protruding down therefrom and a concave finger conforming plunger release stud 104d mounted on its top end and secured by a lock nut 104e. The bottom surface of the plunger base sleeve 104b on each side of divider plate 104c will normally bear against the top surfaces of both latch plates 90e and 92e. Thus by pressing down on release stud 104d the gripping fingers 90g and 92g will be retracted as previously described.

The bell housing 80 is formed with a plunger aperture 106 which extends vertically down through an opening in the central top portion thereof into communication with the spring chamber 101. The plunger aperture 106, in turn, is formed with a reduced lower portion adapted to receive the plunger base sleeve 104b for vertical sliding movement therein and an enlarged internally threaded circular upper portion into which is screwed the lower complementarily threaded end of a tubular handle 108 which encases the connecting rod 104a. This tubular handle 108 extends from its connection with bell housing 80 slightly short of the full length of connecting rod 104a contained and held for axially slidable movement therein. Thus, the plunger release stud 104d protrudes slightly above the upper end of handle 108 as shown in FIGURE 12. A pair of identical curved tubular hand grips 110 and 112 formed underneath with finger-fitting scalloped recesses 110a and 112a are secured laterally on opposite sides of the top end of handle 108. The lengths of tubular handle 108 and connecting rod 104a contained therein are preferably about 2 feet to 2 feet 6 inches long so as to provide a comfortable holding position for workmen installing road surface markers with this apparatus. Thus, in use a marker 20 is gripped by this apparatus, adhesive is applied thereto and then the marker is placed on a road surface in position to form part of a lane divider line. It is released from the installation apparatus by pressing plunger release stud 104d which retracts gripping fingers 90g and 92g. It can be seen that the emplacing work is greatly expedited since the marker is securely held while adhesive is applied. Also, the possibility of smearing adhesive on the workman's hands is vastly reduced and the alignment of markers when they are released is greatly facilitated.

A third embodiment of the road surface marker shown in FIGURES 17 to 22 is preferably used when the marker is utilized in areas of severe weather where scraping equipment such as snow plows may be required to clear the street of accumulated snow. In this form, the basic structure is essentially the same as the marker 20' illustrated in FIGURES 7 to 12, and like numbers primed indicate like or corresponding parts. Preferably, the basic marker structure 20'' is stamped out of heavy gauge sheet stainless steel, with an epoxy resin core, which is less subject to corrosion and stronger than aluminum. Thus, the marker 20'' withstands damage due to snow plows passing over it better than the aluminum marker 20', but is somewhat more expensive due to the higher cost of stainless steel.

The marker 20'' differs from the marker 20' in that there are relatively flat recesses 120a and 120b formed in the shoulders 30'' and 32''. The upper portions of the recesses 120a and 120b, respectively, are sufficiently deep to provide caliper gripping grooves or slots 30b'' and 32b''.

The marker 20'' is provided with a pair of longitudinally extending rounded ribs 122a and 122b which extend parallel to and join the side edges 30a'' and 32a'' respectively, of the top surface 28'', extend above the surface 28'', and join the shoulders 30b'' and 32b'' above the recesses 120a and 120b, respectively.

The upper surfaces of the lobbies 36'' and 38'', the top surface 28'' and the recesses 120a and 120b are coated with bright porcelain enamel 68'. Thus, it can be seen that only recessed portions of the marker 20'' are coated with the porcelain enamel. Because the marker 20' has curved edges 62a', 62b', 62c' and 62d', and only recessed portions are coated with enamel 68', when the blade of a snow plow, which normally extends at about a 45° angle with respect to the longitudinal axis of the marker 20'', engages the marker, the blade will slide up over one of the curved edges of the marker and the ribs 122a and 122b, without breaking the marker or engaging any of the enamel coated surfaces thereof. Thus, it can be appreciated that the marker 20'' is highly advantageous for use as a line marker and reflector device in areas where snow plows or other hard objects must pass over the marker.

Although I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent structures and devices.

I claim:

1. A road surface marker comprising a shallow, generally rectangular body formed with a flat bottom surface defined by an outer marginal edge and adapted to be secured to a road surface, said body being formed with upper surfaces including opposing forward and rear ramps which gradually slope upwardly and inwardly toward each other from the opposite end portions of said marginal edge, a top surface disposed in a plane substantially parallel with said bottom surface, said ramps terminating on opposite ends of said top surface, opposing shoulders extending downwardly and outwardly from each side of said top surface to the adjacent side portion of said marginal edge, and reflector means secured in recessed portions of said forward and rear ramps below the outer surface thereof and positioned so that the reflector means reflect light substantially in alignment with the longitudinal axis of said rectangular body.

2. A road surface marker as defined in claim 1 wherein the recessed portions of said forward and rear ramps extend inwardly along substantially horizontal floor portions thereof and terminate in vertical rear walls, and the reflector means are housed in sockets formed in said rear walls.

3. A road surface marker as defined in claim 2 wherein said reflector means has generally vertical faces substantially coplanar with said vertical rear walls.

4. A road surface marker as defined in claim 2 wherein said reflector means includes a pair of reflectors secured in the recessed portions of each of the forward and rear ramps of said marker, and said pair of reflectors are spaced and separated from each other by a thin vertical buttress member extending from the rear wall to the floor of said recessed portions substantially in alignment with the central longitudinal axis of the body of said road surface marker.

5. A road surface marker as defined in claim 1 wherein the bottom surface of said marker body is formed with a plurality of spaced pockets recessed therein which are adapted to hold a mass of adhesive when secured by said adhesive to a road surface.

6. A road surface marker as defined in claim 1 wherein lifting slots are formed in the shoulders thereof which are adapted to provide a grip for a caliper type installation apparatus.

7. A road surface marker as defined in claim 1, wherein said top surface is generally rectangular, said forward and rear ramps join said shoulders at horizontally, outwardly curved edges sloping downwardly and outwardly from the corners of said generally rectangular top surface to the corresponding corners of the rectangular body adjacent to the outer marginal edge thereof.

8. A road surface marker as defined in claim 7, wherein recesses are formed in said shoulders, and said recesses are shaped to provide lifting slots which are adapted to provide a grip for a caliper type installation apparatus.

9. A road surface marker as defined in claim 7, including longitudinal ribs at the upper end of said shoulders extending the length of said top surface and rising vertically above said top surface.

10. A road surface marker as defined in claim 1, wherein a portion of the upper surfaces of said body is coated with bright porcelain enamel.

11. A road surface marker as defined in claim 10, wherein said coated portion consists of the entire upper surface of said body.

12. A road surface marker as defined in claim 8, including longitudinal ribs at the upper end of said shoulders extending the length of said top surface and rising vertically above said top surface; the upper surfaces of said recessed portions of said forward and rear ramps, said top surface and said recesses formed in said shoulders being coated with bright porcelain enamel.

13. A road surface marker as defined in claim 6 in combination with an installation apparatus comprising a housing formed with a recessed cradle conforming substantially to the upper peripheral surface of said marker, a pair of retractable caliper grips pivotally mounted within said housing having opposing gripping fingers adapted to engage the slots in said marker when positioned within said cradle and caliper grip actuating means which selectively pivots said caliper grips between a marker gripping position and a retracted release position.

14. A road surface marker installation apparatus comprising a hollow housing formed with a recessed cradle in its bottom surface substantially conforming to the upper peripheral surfaces of a road surface marker, a caliper-type road surface marker grip mechanism mounted within said holder housing adapted to engage and hold a road surface marker positioned within said cradle when in its closed gripping position and release said marker when retracted to its open position, said marker grip mechanism disposed near the recessed cradle of said housing so as to be able to hold and release a marker positioned therein, and a trigger means operatively connected with said marker grip mechanism so as to be able to actuate said mechanism to move between a closed marker holding position and an open retracted marker releasing position. .

15. A road surface marker installation apparatus as defined in claim 14 wherein the marker grip mechanism is comprised of a pair of pivotally mounted caliper grips each formed with a central pivot body, a long gripping arm radiating therefrom and a short catch plate radiating from the side of said central body opposite from said gripping arm, each of said gripping arms being formed with an inwardly extending gripping finger, and wherein the mounting of said grip mechanism within the housing of the installation apparatus includes a bearing support for the central pivot body thereof and cavities within which the caliper grips can be fitted which have sufficient room for pivotal movement between the marker holding and releasing positions.

16. A road surface marker installation apparatus as defined in claim 15 wherein said trigger means includes a plunger rod having a release stud on one end and an actuating base on the other end and said actuating base is movably supported within the marker housing to bear against each of the catch plates of the caliper grips so that pressure on said release stud responsively actuates movement of said caliper grips.

17. A road surface marker installation apparatus as defined in claim 16 wherein a spring is mounted within the marker housing which bears against the catch plates so as to urge the caliper grips into closed gripping position.

18. A road surface marker installation apparatus as defined in claim 17 wherein the outer surface of the housing cradle, against which a road surface marker is to be carried, is lined with resilient material and said cradle is shallower than the depth of a road surface marker to be carried therein and provided with aligning tabs extending from its lower edges in longitudinal alignment with the central longitudinal axis of a road surface marker to be carried therein.

19. An installation apparatus for road surface markers which have shallow flat bottomed bodies formed with gradually sloping forward and rear ramps and side shoulders on the top surfaces thereof, reflectors recessed below said ramps in horizontal alignment with the longitudinal axis of said marker and caliper gripping slots formed in each of said side shoulders, said installation apparatus comprising: a bell-shaped housing provided with a recessed bottom cradle conforming to the shape of the top surfaces of a road surface marker but shallower than the depth of said marker and provided with slot openings therethrough which mate with the caliper gripping slots of a marker positioned therein, a pair of caliper grip cavities extending inwardly into said housing and communicating with said slot opening in said cradle; a caliper grip support plate mounted within each of said caliper grip cavities; a central spring cavity in said housing communicating with the inner portions of both of said caliper grip cavities; a plunger aperture opening centrally through the top of said housing and extending vertically therein to communicate with the inner portion of both caliper grip cavities and the central spring cavity; a pair of caliper grips pivotally mounted within said caliper grip cavities, each of said caliper grips being formed with a central body pivotally supported on different portions of said caliper grip support plate, a grip arm radiating outwardly from said central body having a gripping finger positioned to be movable through the slot openings to protrude into said cradle for engagement with the slot in a road surface marker carried therein and a catch plate radiating from said central body inwardly into the juncture of said caliper grip cavities with said plunger aperture and said central spring cavity, and movable therein to cause responsive movement of the connected gripping finger; a coil spring vertically positioned within said central spring cavity and resiliently bearing against both of said catch plates to urge the connected gripping fingers through said slot openings in said cradle; and an actuating plunger formed as an elongated rod with a bottom end trigger base and a top end release stud, said plunger mounted vertically within said housing with the lower end passing through said plunger aperture opening into engagement with both of said catch plates and said plunger axially movable sufficiently to cause downward pressure on said catch plates to pivot the connected gripping fingers out of said cradle in said housing to release a road surface marker held thereby.

20. A road surface marker as defined in claim 19 wherein a tubular handle extends from said plunger aperture and encases said plunger save for the top end release stud and a pair of hand grips extend horizontally from the opposite sides of said handle adjacent said top end release stud.

References Cited
UNITED STATES PATENTS

| | | | |
|---|---|---|---|
| 1,973,176 | 9/1934 | Richardson | 94—1.5 X |
| 2,187,879 | 1/1940 | Johnson | 94—1.5 |
| 2,703,038 | 3/1955 | Shaw | 94—1.5 |
| 2,941,447 | 6/1960 | Abbott | 94—1.5 X |
| 3,086,431 | 4/1963 | Perry | 94—39 |
| 3,217,617 | 11/1965 | Wiswell | 94—1.5 X |
| 3,373,667 | 3/1968 | Taylor-Myers | 94—1.5 |

CHARLES E. O'CONNELL, *Primary Examiner.*

U.S. Cl. X.R.

94—39